United States Patent
Madhow et al.

(10) Patent No.: US 6,426,973 B1
(45) Date of Patent: Jul. 30, 2002

(54) DIFFERENTIAL MINIMUM MEAN SQUARED ERROR COMMUNICATION SIGNAL COMPENSATION METHOD

(75) Inventors: Upamanyu Madhow, Urbana, IL (US); Liping Julia Zhu, San Jose, CA (US); Luis Galup, Niskayuna, NY (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/301,912

(22) Filed: Apr. 29, 1999

(51) Int. Cl.$^7$ .......................... H03H 7/30; H03H 7/40; H03K 5/159
(52) U.S. Cl. .......................... 375/231; 375/232
(58) Field of Search ................. 375/232, 231, 375/340, 343, 233, 147, 136, 348, 349, 150, 152; 708/323, 322

(56) References Cited

U.S. PATENT DOCUMENTS

| | | | | |
|---|---|---|---|---|
| 5,285,480 A | * | 2/1994 | Chennakeshu et al. | 375/348 |
| 5,414,699 A | * | 5/1995 | Lee | 370/342 |
| 5,757,845 A | * | 5/1998 | Fukawa et al. | 375/200 |
| 5,844,951 A | * | 12/1998 | Proakis et al. | 375/347 |
| 6,141,567 A | * | 10/2000 | Youssefmir et al. | 455/562 |
| 6,205,166 B1 | * | 3/2001 | Maruta et al. | 375/130 |

OTHER PUBLICATIONS

A. Naguib, "Adaptive Antennas for CDMA Wireless Networks", Ph.D., Dissertation, Stanford University, Aug. 1996.
H. Liu, M.D. Zoltowski, "Blind Equalizaton in Antenna Array CDMA Systems", *IEEE Trans. Signal Proc.*, vol. 45, No. 1, Jan. 1997, pp. 161–172.
T.F. Wong, T.M. Lok, J.S. Lehnert, M.D. Zoltowski, "Spread Spectrum Signaling Techniques with Antenna Arrays and Blind Adaptation", *Proc. IEEE Milcom '96*.
M. Honig, M. Shensa, S. Miller and L. Milstein, "Performance of Adaptive Linear Interference Suppression for DS–CDMA in the Presence of Flat Rayleigh Fading", *Proc. of VTC '97*, 1997.

(List continued on next page.)

*Primary Examiner*—Chi Pham
*Assistant Examiner*—Phuong Phu
(74) *Attorney, Agent, or Firm*—Greer, Burns & Crain, Ltd.

(57) ABSTRACT

This invention reformulates the MMSE criterion to apply to systems in which the desired data to be tracked is the ratio of the data appearing in successive observation intervals. The resulting differential MMSE criterion leads to a number of novel algorithms for adaptive implementation of the MMSE receiver. Applications include equalization for single user systems, and multiuser detection, or interference suppression, for direct sequence CDMA with short spreading sequences (i.e., the period of the spreading sequence equals the symbol interval). The invention also provides blind (i.e., without the requirement of a training symbol sequence for the user of interest) equalization and beamforming (using a receive antenna array) for direct sequence CDMA systems with long spreading sequences (i.e., systems in which the spreading sequences are aperiodic, or have period much larger than the symbol interval). The invention enables recovery of the desired symbol sequence up to an unknown phase. The invention is therefore well suited to the demodulation of differentially modulated data, in which information is encoded in the phase differences of successive transmitted symbols. Assuming that the channel amplitude and phase is approximately constant over two successive symbol intervals, the demodulator can use the differences in phases of two successive received symbols to recover differentially encoded data. The invention may also be used in conjunction with a separate phase recovery method to demodulate data without differential modulation.

8 Claims, 2 Drawing Sheets

OTHER PUBLICATIONS

M. Honig, U. Madhow, S. Verdu, "Blind Adaptive Multiuser Detection", *IEEE Transactions on Information Theory*, vol. 41, No. 4, Jul. 1995.

L.J. Zhu, U. Madhow, "Adaptive Interference Suppression for Direct Sequence CDMA Over Severely Time–Varying Channels", *Proc. IEEE Globecom '97*.

L. Galup, U. Madhow, "Blind Spatial Interference Suppression of DS–CDMA with Long Spreading Sequences", *Proc. 1998 IEEE International Symposium on Information Theory (ISIT'98)*, Aug. 1998.

L.J. Zhu, U. Madhow, "MMSE Interference Suppression for Radidly Faded CDMA Systems: A New Formulation for Differentially Modulated Signals", *Proc. 1998 IEEE International Symposium on Information Theory (ISIT '98)*, Aug. 1998.

A. Abdulrahman, D.D. Falconer, A.U. Sheikh, "Decision Feedback Equalization for CDMA in Indoor Wireless Communications", *IEEE J. Sel. Areas Commun.*, vol. 12, No. 4, pp. 698–706, May 1994.

P.B. Rapajic and B.S. Vucetic, "Adaptive Receiver Structures for Asynchoronous CDMA Systems", *IEEE J. Sel. Areas in Commun.*, vol. 12 No. 4, pp. 685–697, May 1994.

* cited by examiner

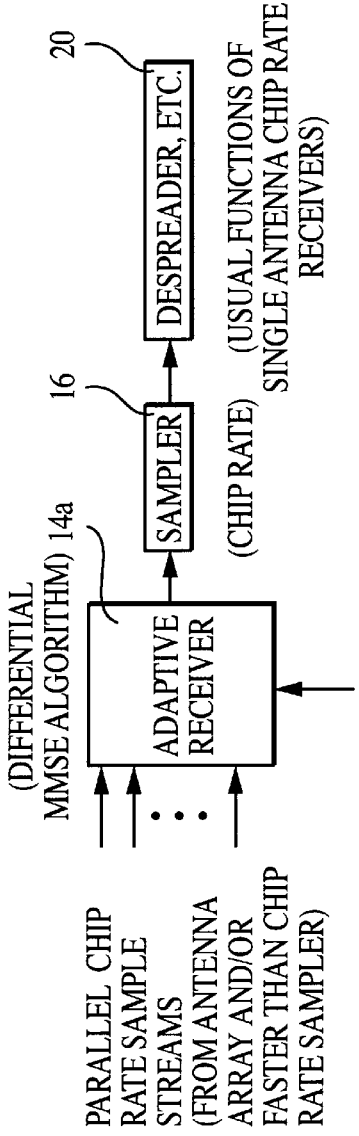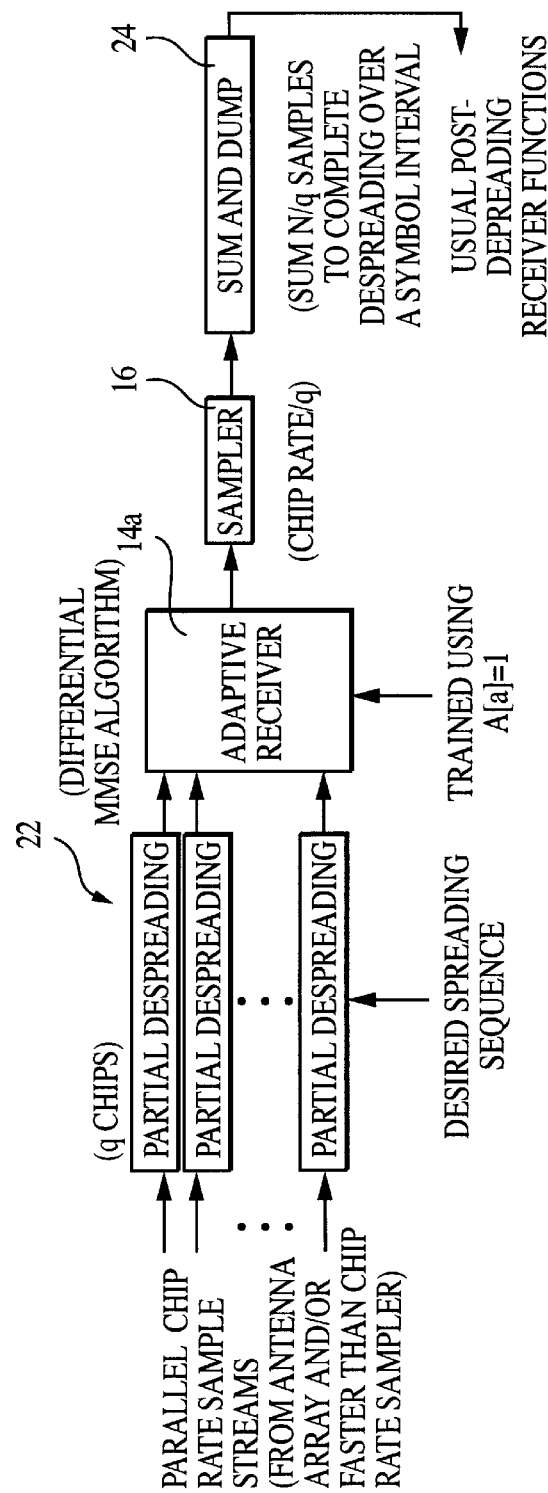

DIFFERENTIAL MINIMUM MEAN SQUARED ERROR COMMUNICATION SIGNAL COMPENSATION METHOD

FIELD OF THE INVENTION

The invention generally concerns the linear Minimum Mean Squared Error (MMSE) criterion, which minimizes the Mean Squared Error (MSE) between the receiver output and the desired data for communication receiver design. Exemplary applications that the invention is applicable to include equalization, crosstalk cancellation, beamforming using antenna arrays, and multiuser detection in Code Division Multiple Access (CDMA) systems.

BACKGROUND OF THE INVENTION

The invention provides communication receiver crosstalk suppression. Additional applications of the invention include equalization for single user differentially modulated systems.

A basic problem in wired and wireless communications concerns an interference which can cause a receiver to decode something other than the data which was sent to it. Interference may be suppressed or compensated to limit such errors. As an example, single user communication over a dispersive channel is limited by the presence of intersymbol interference (ISI). For multiuser communication, an additional impairment is due to multiple-access interference (MAI). Methods for mitigating ISI are referred to as equalization, and methods for mitigating MAI are referred to as multiuser detection or interference suppression. The linear minimum mean squared error MMSE criterion has been used to design equalizers for decades. Recently, it was recognized that it could also be used to design receivers for interference suppression for direct sequence CDMA systems with short spreading sequences, in which the MAI has a repetitive structure that can learned and exploited by the receiver. The key advantage of the MMSE criterion is that it yields adaptive receiver training algorithms. Such algorithms typically use an initial training sequence of known data, followed by continued decision-directed adaptation based on receiver decisions. The requirement of known data for training is, however, also a drawback since it uses otherwise available bandwidth.

With the recent growth in wireless communications, there is much interest in applying equalization/interference suppression to wireless channels. However, a major impairment in a wireless communication system is fading, which causes severe fluctuations in the amplitude and phase of the received signal. Fading is caused by varied distances from a transmitter, atmospheric conditions, and other phenomena which causes such fluctuations. Known existing adaptive algorithms cannot track these fluctuations even for moderate levels of fading, without a large overhead in terms of known pilot symbols. The known algorithms therefore have little practical value since pilot symbols exhaust excessive bandwidth.

Known techniques also have shortcomings in beamforming applications for receive antenna arrays. For direct sequence CDMA systems with long spreading sequences, the MAI does not have a repetitive structure in the time domain, so that time domain adaptive algorithms do not apply. However, if the receiver is equipped with an antenna array, the MAI has a repetitive structure in the spatial domain, because the array response to the signal arriving from a given user varies slowly over time. The problem is how to exploit this feature to adaptively put nulls in the directions of the MAI. The known methods fail because of the required sequence of training symbols to be transmitted by the user of interest. The complexity of the known algorithms are a further drawback.

Some prior methods have sought to address these problems. For single user applications, one method for dealing with fading channels is to insert known pilot symbols periodically, and use these to track the amplitude and phase of the desired user. The overhead required for this can be quite high, especially for channels that vary fast (so that pilot symbols must be inserted more frequently). This method has also been proposed for multiuser applications in H. V. Poor and X. Wang, "Adaptive Multiuser Detection in Fading Channels", *Proc. 34th Annual Allerton Conf. on Communications, Computing and Control*, Monticello, Ill., October.

Another prior method for dealing with fading channels is to use blind algorithms that do not attempt to track amplitude and phase fluctuations, but exploit some other known feature of the desired user (e.g., knowledge of spreading waveform and timing of desired user for interference suppression, see, M. Honig, U. Madhow, S. Verdu, "Blind Adaptive Multiuser Detection", *IEEE Transactions on Information Theory*, Vol. 41, No. 4, July 1995, or knowledge of array response for desired user in beamforming, see, D. H. Johnson, D. E. Dudgeon, *Array Signal Processing: Concepts and Techniques*, Englewood Cliffs, N.J., Prentice-Hall, 1993). Such methods will fail to produce the desired signal suppression if the knowledge regarding the desired signal is inaccurate. In addition, they have poorer performance in terms of convergence and steady state performance than training based methods.

The use of differential modulation to avoid tracking amplitude and phase for CDMA systems with fading was proposed in M. Honig and M. Shensa and S. Miller and L. Milstein, "Performance of Adaptive Linear Interference Suppression for DS-CDMA in the Presence of Flat Rayleigh Fading", *Proc. of VTC'97*, 1997. An adaptive algorithm for receiver training was proposed. However, this algorithm is not robust, and periodically needs to switch to a fallback mode in which the blind algorithm of M. Honig, U. Madhow and S. Verdu, "Blind Adaptive Multiuser Detection", *IEEE Transactions on Information Theory*, Vol. 41, No. 4, July 1995, is used. Two of the inventors on the present invention suggested a fix to this problem in L. J. Zhu, U. Madhow, "Adaptive Interference Suppression for Direct Sequence CDMA over Severely Time-Varying Channels", *Proc. IEEE Gloecom '97*, where the correlator updates from a standard LMS or RLS algorithm were scaled to maintain approximately unit energy at the correlator output. The latter approach was an ad hoc fix, however, and failed to provide a systematic framework for algorithm development and extensions which are fundamental to design of practical communication systems.

General blind source separation algorithms also exist for separating a number of independent users using antenna arrays, see, for example, X. Cao and R. Liu, "General Approach to Blind Source Separation", *IEEE Transactions on Signal Processing*, Vol. 44, No. 3, pp. 562–71. However, these algorithms are complex, and their performance is not as good as that of algorithms that exploit application-specific features. Better algorithms that do exploit the properties of CDMA with long spreading sequences have been proposed in the literature. See, e.g. H. Liu, M. D. Zoltowski, "Blind Equalization in Antenna Array CDMA Systems", IEEE Trans. Signal Proc., Vol. 25, No. 1, pp. 161–172, Jan. 1997, and A. Naguib, "Adaptive Antennas for CDMA Wireless Networks", Ph.D. Dissertation, Stanford University, August 1996. While these address some problems, alternatives to these are desirable.

SUMMARY OF THE INVENTION

This invention reformulates the MMSE criterion so that it applies to systems in which the desired data to track is the ratio of the data appearing in successive observation intervals. The resulting differential MMSE criterion leads to a number of novel algorithms for adaptive implementation of the MMSE receiver. Applications include equalization for single user systems and multiuser detection, or interference suppression, for direct sequence CDMA systems employing short spreading sequences (i.e., the period of the spreading sequence equals the symbol interval). The invention also provides a method for blind, i.e., without knowledge of the symbol sequence sent by the user of interest, equalization or beamforming (using a receive antenna array) for direct sequence CDMA systems with long spreading sequences, i.e., systems in which the spreading sequences are aperiodic, or have period much larger than the symbol interval. Equalization and interference suppression for direct sequence CDMA with short spreading sequences is provided by the invention to enable interference suppression without tracking the fading channel seen by the desired user. The invention therefore enables recovery of the desired symbol sequence up to an unknown phase. Hence, the invention is well suited to the demodulation of differentially modulated data in which information is encoded in the phase differences of successive transmitted symbols. Assuming that the amplitude and phase over a fading channel is approximately constant over two successive symbol intervals, the demodulator can use the differences in phases of two successive received symbols to recover differentially encoded data. It is also possible to use the invention in conjunction with a separate phase recovery method to demodulate data without differential modulation.

The invention may be used to conduct blind equalization and beamforming for direct sequence CDMA systems with long spreading sequences based on the observation that the unknown symbols of the desired user are constant over the elements (referred to herein as "chips") of the spreading sequence within the symbol interval. Since the spreading sequence of the desired user is known, the ratio of two successive chips within a symbol interval is known. Therefore, the following analogy may be established with a CDMA system with short spreading sequences: (a) the unknown symbol modulation plays the role of slow fading that the invention avoids tracking, (b) the known spreading sequence for the desired user plays the role of a training sequence at the chip rate, (c) the array response plays the role of a short spreading sequence.

BRIEF DESCRIPTION OF DRAWINGS

Other objects, features and advantages of the invention will be apparent to artisans who read the detailed description and reference the accompanying drawings, of which:

FIG. 2 is a block diagram of a receiver structure according to the invention for CDMA with long spreading sequences; and FIG. 3 is a block diagram of reduced complexity receiver structure according to the invention for CDMA with long spreading sequences.

DETAILED DESCRIPTION OF THE INVENTION

General System Model

Figure 1:
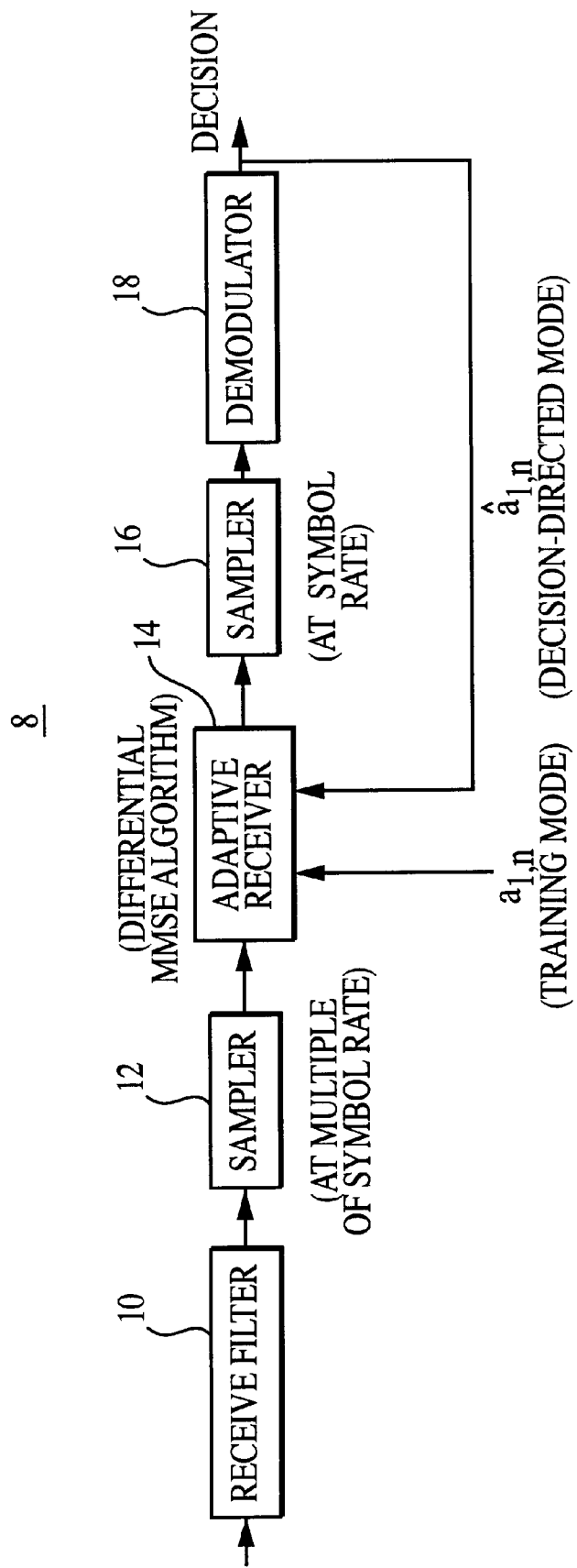
FIG. 1 is a block diagram for a receiver structure for equalization and for CDMA with short spreading sequences constructed in accordance with the invention to operate on samples at a multiple of the symbol rate.

The following generic model for adaptive equalization, interference suppression or beamforming, is described in complex baseband, discrete time, notation. Thus, it is assumed that the received signal has already been passed through an appropriate filter and sampler. A linear receiver c operates on a sequence of received vectors $\{r_n\}$. Each received vector $r_n$ is an L-dimensional complex vector which is a sum of a number of signal vectors, plus noise, where each signal vector corresponds to ISI or MAI. The output at time n of the linear receiver c to be designed is given by $$\langle c, r_n \rangle = \sum_{i=1}^{L} c^*[i] r_n[i],$$

where $$r_n = B_1[n]u_1 + \sum_{k=2}^{K} B_k[n]u_k + w_n.$$

Here $u_1$ is the desired signal vector, and $u_2, \ldots, u_K$ are interference vectors. These are assumed to remain roughly the same (or to vary slowly) with n. The terms $\{B_k[n], k=1, \ldots, K\}$ can vary arbitrarily with n, and their interpretation depends on the application. The vector $w_n$ is discrete-time noise.

A standard linear MMSE receiver minimizes the Mean Squared Error (MSE) between the receiver output and the desired sequence $B_1[n]$, given by $E[(\langle c, r_n \rangle - B_1[n])^2]$. Such a receiver can be implemented adaptively using a number of well known algorithms. The adaptive algorithms are initialized by a known training sequence $\{t[n]\}$. Assuming that the desired sequence $\{B_1[n]\}$ satisfies $B_1[n]=g[n]t[n]$, where g[n] is an unknown gain, and that g[n] varies slowly with n, standard adaptive algorithms based on the cost function $E[(\langle c, r_n \rangle - t[n])^2]$ can automatically compensate for the unknown gain g[n]. However, this procedure becomes difficult or impossible to implement when the variations in the unknown gain g[n] are too rapid for the adaptive algorithm to compensate for them.

Differential MMSE Detection

In applications of interest to application of the invention, the desired sequence $\{B_1[n]\}$ includes an unknown gain g[n], but the gain g[n] is roughly constant over two observation intervals. Thus, it is assumed that $$A_1[n] = \frac{B_1[n]}{B_1[n-1]}$$

is either known (because of training) or can be estimated. An important aspect of the invention is choosing the correlator c to satisfy the following differential MMSE criterion: Minimize $$E[(\langle c, r_n \rangle - A_1[n] \langle c, r_{n-1} \rangle)^2] \qquad (2)$$

subject to $$E[|\langle c, r_n \rangle|^2] = c^H R c = 1 \qquad (3)$$

where $R = E[r_n r_n^H]$, and where $x^H$ denotes the conjugate transposed of x. It can be shown that, under standard assumptions, the solution to the above problem is the same as that for the conventional MMSE problem. However, the reformulation of the invention removes the need to track the unknown gain in $B_1[n]$ by using $B_1[n-1]$ as a reference. Applying the reformulation of the invention will allow artisans to perform standard optimization techniques and obtain a number of adaptive communication algorithms. Specific preferred algorithms are given below, but the reformulation itself represents an important broader aspect of the invention.

Algorithms

The solution to the optimization problem (2)–(3) is the generalized eigenvector with the largest eigenvalue for the following generalized eigenvalue problem:

$$Bc=\nu Rc$$

where $B=E[A_1^*[n]r_n r_{n-1}^H + A_1[n]r_{n-1}r_n^H]$.

Block Algorithms

Replacement of statistical expectations by empirical averages over M observation intervals leads to block algorithms. This is analogous to the block LS algorithm for standard MMSE adaptation.

1. Compute $\hat{R} = \sum_{n=1}^{M} r_n r_n^H$ and $\hat{B} = \sum_{n=1}^{M} A_1^*[n]r_n r_{n-1}^H + A_1[n]r_{n-1}r_n^H$ 2. Use any standard algorithm to find the largest generalized eigenvector c for the pair $(\hat{B}, \hat{R})$ One possible algorithm is the power algorithm, see, Golub and Van Loan, *Matrix Computations*, Baltimore, John Hopkins University Press, 1996, applied to $\hat{R}^{-1}\hat{B}$.

Recursive Algorithms

Instead of averaging over a block of data, the averages can be performed recursively, using an exponential forget factor $0<\lambda\leq 1$. This is analogous to the RLS algorithm for standard MMSE adaptation.

1. Update $\hat{R}_n = \lambda\hat{R}_{n-1}+(1-\lambda)r_n r_n^H$ and $\hat{B}_n=\lambda\hat{B}_{n-1}+(1\lambda)[A_1^*[n]r_n r_{n-1}^H + A_1[n]r_{n-1}r_n^H]$.

2. Update the largest generalized eigenvector $c_n$ for the pair $(\hat{B}_n, \hat{R}_n)$. One possibility is to apply one or more steps of the power algorithm on the matrix $\hat{R}_n^{-1}\hat{B}_n$ where $\hat{R}_n^{-1}$ is updated using a standard RLS mechanism.

Gradient Projection Algorithms

Alternatives to the preceding are obtained by updating c using a stochastic gradient for the cost function (2), together with a normalization that projects c approximately onto the constraint surface given by (3). This is analogous to the LMS or normalized LMS (NLMS) algorithm.

$$c_n = \frac{c_{n-1}+\frac{\mu}{M_n}r_n <c_{n-1}, r_{n-1}A_1[n]-r_n}{\sqrt{c_{n-1}^H R c_{n-1}}} \quad (4)$$

where $$M_n=\lambda M_{n-1}+(1-\lambda)r_n^H r_n \quad (5)$$

estimates the power of the received vector, and and where f1 is an estimate of the correlation matrix R.

Communication Systems Having Frequency Nonselective Fading

For a digitally modulated system in which user k uses symbol waveform $S_k(t)$ to modulate all its transmitted symbols, the transmitted baseband signal for user k is given by $$\sum_n b_{k,n}S_k(t-nT),$$

$b_{k,n}$ is the nth symbol of the kth user. This model applies both to narrowband systems with ISI and co-channel interference, and to wideband CDMA systems with short spreading sequences. Assuming that the fading is slow relative to the symbol interval, the received signal for the kth user may be modeled as $$\sum_n b_{k,n}F_k[n](S_k * g_k(t-nT)),$$

where $\{F_k[n]\}$ is a sequence of complex numbers modeling amplitude and phase fluctuations due to fading, and $g_k(t)$ is a normalized channel impulse response which is well modeled as time invariant (on the time scale of the receiver adaptation). The transmitted symbols $\{b_{1,n}\}$ may or may not be differentially modulated, depending on whether there is a separate phase recovery mechanism. In either case, algorithms based on the differential MMSE criterion are driven by the ratio of successive transmitted symbols, denoted by $$a_{1,n} = \frac{b_{1,n}}{b_{1,n-1}}.$$

Referring now to FIG. 1, a receiver system 8 according to the invention is shown. A signal is received by receive filter 10 (typically chosen to be a chip matched filter for CDMA systems). The output of the filter 10 is sampled by the sampler 12, typically at the chip rate or faster for CDMA systems, and at the symbol rate or faster for narrowband systems. The samples are fed into the adaptive receiver 14. The output of the adaptive receiver 14 is sampled at the symbol rate by sampler 16 (which may or may not be required, depending on the implementation). This generates one decision statistic for each symbol of the desired user. These decision statistics are fed to the demodulator 18. The demodulator may be a differential demodulator, or it may use input from a separate phase recovery mechanism to perform direct demodulation.

The vector of samples within an observation interval is of the form given by (1) where the time index n corresponds to the symbol time, the desired sequence $B_1[n]=F_1[n]b_{1,n}$, and with the desired vector $u_1$ denoting the sampled and windowed (the window size is determined by the filter length) version of the cascade of the symbol waveform and the channel seen by the desired user. For k=2, . . . , K, the sequences $\{B_k[n]\}$ and the vectors $u_k$ represent contributions due to ISI and MAI. Assuming that the fading is roughly constant over two successive symbols (i.e., $F_1[n]\approx F_1[n-1]$), $B_1[n]\approx A_1[n]B_1[n-1]$, where $A_1[n]=a_{1,n}$ is the ratio of two successive transmitted symbols for the desired user. Algorithms based on the differential MMSE criterion can now be directly applied, using an initial training sequence for $\{a_{1,n}\}$, followed by decision-directed adaptation. If $b_{1,n}$ is differentially modulated, then $a_{1,n}$ is the informaiton sequence. In this case, decisions $a_{1,n}$ would typically be based on the metric $<c,r_n><c,r_{n-1}>^*$.

CDMA Receiver with Long Sequences

A modified system with an adaptive receiver 14a for CDMA with long spreading sequences is shown in FIG. 2. The transmitted signal for the kth user is of the form $\Sigma_n S_k[n]b_{k,n}\psi(t-nT_c)$ where $\psi(t)$ is a wideband chip waveform, $\{S_k[n]\}$ is the spreading sequence for the kth user, $T_c$ is the chip interval, and $b_{k,n}$ is the symbol sequence for the kth user expressed at the chip rate. In this section, the time index n refers to the chip time. The symbol sequence changes N times slower than the chip sequence, where N denotes the processing gain. Thus, for each i (corresponding to the ith transmitted symbol), $b_{k,n}$ is constant for $iN \leq n \leq (i+1)N-1$. Long spreading sequences are assumed, i.e., that the spreading sequence $\{S_k[n]\}$ is aperiodic, or has period much larger than the processing gain N. The receiver is assumed to employ an antenna array with $M_1$ elements and/or sampling at a multiple $M_2$ of the chip rate. This leads to $L=M_1M_2$ parallel chip rate sequences of samples, as shown in FIG. 2. At chip time n, we therefore obtain an L-dimensional vector of samples $r_n$. This conforms to the general model (1) needed to apply algorithms based on the differential MMSE criterion as follows. The desired vector $u_1$ corresponds to the array/channel response for the desired user, while the remaining vectors represent inter-chip interference and MAI Denoting the desired user as user 1, the desired sequence $B_1[n]=b_{1,n}s_1[n]F_1[n]$, where $b_{1,n}$ and $F_1[n]$ are nuisance parameters due to symbol modulation and fading, respectively. However, the symbol modulation changes only every N chips, and the fading is roughly constant over successive chips. Therefore, at all chip times except those at the edges of the symbol interval (where the symbol value $b_{1,n}$ can change), $B_1[n] \approx A_1[n]B_1[n-1]$, where $A_1[n]=S_1[n]/S_1[n-1]$ depends only on the known spreading sequence for the desired user. We may now apply the differential MMSE algorithms in the adaptive receiver 14a, updating or averaging at the chip rate (except at chip boundaries where the symbol modulation changes). This gives blind receiver algorithms for beamforming and fractionally spaced equalization, depicted in FIG. 2. Artisans will appreciate that the symbol sequence $b_{1,n}$ is arbitrary, and in particular, need not be differentially modulated.

In FIG. 2, the chip rate sampler 16 may or may not be present, depending on the implementation. The presence of the sampler 16 emphasizes that the adaptive receiver produces decision statistics at the chip rate, where the nth decision statistic is an estimate of the product of the symbol and chip sequence of the desired user (up to a phase uncertainty). This can be followed by typical operations performed by a direct sequence CDMA receiver, which include despreading by the despreader 20. Despreading refers to multiplying the chip rate decision statistics by the complex conjugate of the spreading sequence so as to remove the dependence of the spreading sequence. The despread data depends on the symbol sequence of the desired user, and can be demodulated and decoded in the usual fashion. A separate phase recovery mechanism may be required if the symbol sequence is not differentially nmodulated, since differential MMSE algorithms avoid tracking the desired user's phase.

Updating or averaging at the chip rate may be too complex for some applications. One way to reduce the complexity is to partially despread the received signal over q despreader chips 22 (q=N/p for some integer p), and to then apply a differential MMSE algorithm, in the adaptive receiver 14a as depicted in FIG. 3. In FIG. 3, the adaptive receiver 14a operates on the partially despread data, and generates decision statistics at 1/q times the chip rate at the output of the sampler 16. Since the despreading has been performed earlier, the N/q decision statistics corresponding to a given symbol no longer depend on the spreading sequence, and can simply be summed as in 24 to provide an estimate of the symbol, which can be further processed for demodulation and decoding. That is, we obtain a sequence of L-dimensional vectors $\{\tilde{r}_m\}$ (at a rate q times slower than the chip rate) as follows:

$$\tilde{r}_m = \sum_{n=mq}^{n=(m+1)q-1} S_1[n] * r_n \qquad (6)$$

The sequence $\{\tilde{r}_m\}$ still adheres to the general model (1), and the desired vector $u_1$ is unchanged by the partial despreading operation. However, the desired sequence $B_1(m)$ is now a product of the symbol modulation and the fading gain alone, since the dependence on the spreading sequence $\{s_1[n]\}$ has been removed by the partial despreading operation (6). Thus, again avoiding chip boundaries corresponding to the edges of the symbol interval, we obtain $B_1[m] \approx A_1[m]B_1[m-1]$, where $A_1[m]=1$, and differential MMSE algorithms apply as before.

Extension to Multipath, or Frequency Selective, Fading Channels

For most applications of interest, it is sufficient to model a multipath channel as consisting of a finite number of discrete channels, each modulated by a different fading gain. The fading gains on different paths are usually assumed to vary independently. For very slow fading, multipath fading is accounted for automatically by the differential MMSE criterion, since the signal vectors in the the basic model (1) can be interpreted as resulting from combining all the multipath components. However, these effective signal vectors cannot be modeled as roughly constant for moderate or high fading rates, since the relative values of fading gains for different multipath components change. In this case, it is necessary to explicitly account for multipath using suitable extensions of the differential MMSE formulation. In the following, we describe separately the extensions required for the two major applications previously discussed: adaptive equalization and interference suppression for CDMA with short spreading sequences, and adaptive equalization and beamforming for CDMA with long spreading sequences.

Application 1: Equalization, and CDMA with Short Sequences

It was shown above how the general model (1) applies to equalization and interference suppression for CDMA with short spreading sequences. Again, let $\{b_{1,n}\}$ denote the symbol sequence for the desired user. For a multipath channel, the received vector may be written as $$r_n = b_{1,n} \sum_{i=1}^{M_1} F_{1i}[n] v_{1i} + Interference + Noise \qquad (7)$$

where, for $1 \leq i \leq M_1$, $F_{1i}[n]$ is the fading gain corresponding to the ith multipath component for the desired user, and $v_{li}$ is the signal vector obtained after filtering and windowing the cascade of the symbol waveform and the channel corresponding to the ith multipath component. For a wideband CDMA system, the multipath can be resolved at the granularity of the chip interval, and the $v_{li}$ are typically shifts of the spreading waveform. We define $$a_{1,n} = \frac{b_{1,n}}{b_{1,n-1}}$$

as before as the ratio of two successive transmitted symbols. In applying the differential MMSE algorithms we set $a_{1,n} = A_1[n]$ as before.

While there are several possible extensions of differential MMSE to this scenario, we discuss two important ones as examples.

The Eigen-RAKE Receiver

The basic generalized eigenvalue problem resulting from the formulation is as before:

$$Bc = \upsilon Rc$$

where $B=E[A_1^*[n]r_n r_{n-1}^H + A_1[n]r_{n-1}r_n^H]$, and $R=E[r_n r_{n-1}^H]$.

The new feature due to multipath is the structure of B. Instead of $B=E[|F_1[n]|^2]u_1 u_1^H$ we now have $$B = \sum_{i=1}^{M_1} E[|F_{1i}[n]|^2] v_{li} v_{li}^H \tag{8}$$

Thus, the matrix $R^{-1}B$ now has several orthogonal eigenvectors with nonzero eigenvalues, and each of these eigenvectors provides an interference suppressing correlator. Combining these correlator outputs provides diversity gain against frequency selective fading. The eigenvectors span, and are spanned by, the multipath vectors $\{v_{li}\}$, but they are not identical to the $\{v_{li}\}$. It is not necessary to explicitly estimate the $v_{li}$ (which, for a CDMA system, amounts to estimating the timing of the multipath components) explicitly for demodulation, since the eigenvectors can be directly used for this purpose. Rather, obtaining the eigenvectors of $R^{-1}B$ may be viewed as a form of implicit timing acquisition with automatic interference suppression.

One possible receiver architecture is a RAKE-like structure with $N_1$ decision statistics being combined, where $N_1 \leq M_1$ is chosen based on complexity considerations. The $N_1$ decision statistics correspond to the correlators corresponding to the $N_1$ largest eigenvalues of $R^{-1}B$. The correlators $C_1, \ldots, C_{N1}$, corresponding to the $N_1$ largest eigenvalues can be obtained from $R^{-1}B$ either by straightforward eigendecomposition, by subspace tracking methods, or by generalizations of the power algorithm, see, Golub and Van Loan, *Matrix Computations*, Baltimore, John Hopkins University Press, 1996. For completeness, we sketch the latter option below.

The Orthogonal Iteration

The orthogonal iteration is a generalization of the power method. It can be used to compute several dominant eigenvalues and their corresponding eigenvectors for an L×L matrix M. In our case, $M=R^{-1}B$, and we want to compute the $N_1$ largest eigenvalues and the corresponding eigenvectors, where $N_1 \leq L$. Given an L×$N_1$ matrix $Q_0$ with orthonormal columns, the orthogonal iteration generates a sequence of L×$N_1$ matrices $\{Q_k\}$ with orthonormal columns. When the iterations converge, the columns of $Q_k$ are the required eigenvectors.

for k=1, 2 . . .

$Z_k = MQ_{k-1}$ $Q_k R_k = Z_k$ (QR factorization)

end

For $N_1=1$, this reduces to the power algorithm.

Adaptive Implementation

Adaptive implementations are also provided. As before, for a block algorithm, we simply replace the statistical averages R and B in the orthogonal iteration by empirical averages $\hat{R}$ and $\hat{B}$, respectively, where the averages are performed over a block of symbols. For recursive implementations, the averaging employs an exponential forget factor, and one or more orthogonal iterations are performed per recursive update.

Combining Rule

Having obtained $N_1$ orthogonal interference suppressing correlators $c_1, \ldots, c_{N1}$ as described above, we can combine their outputs coherently (if separate phase tracking is available) or noncoherently in different ways. One possible method for noncoherent combining is described below.

Normalizing the $c_i$ to unit norm, let $P_i$ and $\sigma_i^2$ denote the desired signal power and the variance of the interference plus noise, respectively, in the decision statistic $Z_i = \langle c_i, r_n \rangle$. The variance can be estimated as $$\sigma_i^2 = c_i^H R c_i - c_i^H B c_i \tag{9}$$

since $c_i^H R c_i$ is the average output energy, and $c_i^H B c_i$ is the average desired signal energy in the output. The variations in $\sigma_i^2$ are small, since the amplitude fluctuations in the interference gets averaged out among a lot of terms. However, the desired signal energy fluctuates significantly due to fading, and it is important to use its instantaneous value to obtain the maximum diversity combining. Thus, it is possible to use the estimate $$P_i = |\langle c_i, r_n \rangle|^2 \tag{10}$$

ignoring the contribution of the noise and interference to the instantaneous output energy. The overall decision statistic for differential demodulation based on maximal ratio combining is now given by $$Z = \sum_{i=1}^{n_1} \frac{P_i}{\sigma_i^4} \langle c_i, r_n \rangle \langle c_i, r_{n-1} \rangle^* \tag{11}$$

$$= \sum_{i=1}^{N_1} \frac{|\langle c_i, r_n \rangle|^2}{|c_i^H R c_i - c_i^H B c_i|^2} \langle c_i, r_n \rangle \langle c_i r_{n-1} \rangle^*$$

Depending on the application, other combining rules could be used. However, the key feature of the architecture is the decomposition of the multipath fading channel into $N_1$ parallel subchannels by projection along the orthogonal correlators $c_i$.

The Projection Combining Receiver

If explicit timing information for the significant multipath components is available (i.e., if estimates of the multipath vectors $\{v_{li}\}$ are available), the following alternative projection combining receiver can be used.

Again, there are $N_1$ correlators, where $N_1 \leq M_1$. Each correlator performs interference suppression, while extracting desired signal energy from one of the $M_1$ multipath components. Specifically consider a correlator associated with the ith multipath vector $v_{li}$. Define the subspace $S_i$ as the space spanned by the collection of all other significant multipath vectors, $\{v_{lj}, j \neq i\}$, and define $r_n^{(i)} = P^\perp s_i r_n$ as the component of the received vector orthogonal to this subspace. The sequence of vectors $\{r_n^{(i)}\}$ I can be viewed as the output of a frequency nonselective subchannel, and the original differential MMSE formulation described above can be applied to obtain a correlator $c_i$. The outputs of the $N_1$ correlators (we may choose the $N_1$ strongest multipath components, if $N_1 < M_1$) thus obtained can now be combined to provide the net decision statistic.

The basic architecture of decomposing the multipath channel into subchannels which are treated as frequency nonselective is the important idea. Artisans will appreciate that a number of different combining rules may be used, depending on the application.

Application 2: CDMA with Long Sequences

Here n now indexes the chip time rather than the symbol time, and that $r_n$ is an L dimensional vector obtained from an antenna array and/or oversampling. Assuming that the multipath channel is resolved at the granularity of the chip interval, we may write $$r_n = \sum_{i=1}^{M_1} F_{li}[n]b_{1,n}S_1[n-\tau_i]v_{li} + \text{Interference} + \text{Noise} \quad (12)$$

where $F_{1i}[n]$ is the fading gain for the ith multipath component, $b_{1,n}$ is the symbol modulation (expressed as a piecewise constant sequence at the chip rate), $\{s_1[n]\}$ is the spreading sequence of the desired user, $\tau_i$ is the delay for the ith multipath component expressed as a multiple of the chip interval, and $v_{1i}$ is the response of the array and/or oversampler to the ith multipath component, assumed to vary slowly compared to the update rate of the adaptation. For long spreading sequences, the shifted sequences $\{S_1[n-\tau_i]\}$ have very low correlations with each other, so that the $M_1$ multipath components for the desired user may be thought of as independent subusers sending uncorrelated chip rate sequences. We may therefore apply the above described original differential MMSE formulation separately to a subuser at each hypothesized delay, since the other subusers will be treated as interference by the differential MMSE criterion. The correlators obtained for different subusers can then be combined suitably to demodulate the desired user. A variety of receivers may be derived based on these key observations, and one possibility is described in detail below.

Step 1: Choose the set of delay hypotheses based on knowledge of channel delay spread and any other available information.

Step 2: For each hypothesized delay $\tau_i$, run the differential MMSE algorithm with $A_1[n]=S_1[n-\tau_i]/S_1[n-1-\tau_i]$. Skip the symbol edges during updates as described above. Complexity reduction by integration over several chip intervals can also be applied as above. This results in a correlator $c_i$ for the ith delay hypothesis. The computation of $R^{-1}$, which is common for each hypothesis, dominates the computational complexity, so that the overall complexity here is comparable to that of the above discussed differential MMSE formulation for a frequency nonselective channel with known timing.

Step 3: The decision statistic for the kth symbol, assuming processing gain N, is given by $$Z_i(k) = \sum_{n=\tau_i+(k-1)N}^{kN+\tau_i} \langle c_i, r_n \rangle s_1^*[n-\tau_i]$$

The overall decision statistic is then given by $$\sum_i \alpha_i Z_i(k)$$

for coherent detection (assuming that the phase ambiguity is resolved at the symbol level by some means), and $$\sum_i \alpha_i Z_i(k)[Z_i(k-1)]^*$$

for differential detection. The weights $\alpha_i$ can be chosen according to maximal ratio combining, or any other convenient criterion.

An important observation here is to note that, for long spreading sequences, different multipath components for a given user can be viewed as different subusers, so that the differential MMSE algorithm may be applied separately to each subuser, and the results can be combined.

Artisans will thus appreciate that the invention provides adaptive algorithms with guaranteed convergence for equalization and interference suppression in differentially modulated systems. The invention simultaneously addresses two major bottlenecks in high capacity wireless communications, fading and interference. Differential modulation is an effective means of dealing with fading, but it is not as commonly used as it could be due to lack of interference suppression in differentially modulated systems. Prior systems therefore often expend a large amount of overhead in pilot symbols tracking amplitude and phase over fading channels in order to use available equalization or interference suppression techniques for coherent modulation. The invention enables interference suppression for differentially modulated systems, thus avoiding such overhead. Applications include narrowband systems as well as wideband CDMA systems with short spreading sequences.

Artisans will also appreciate that the invention provides adaptive beamforming algorithms for receive antenna arrays for CDMA systems with long spreading sequences. Knowledge of the spreading sequence of the desired user is used as a training sequence, thus avoiding the need for a known sequence of training symbols. Since the unknown symbol sequence modulates the known spreading sequence, application of the differential MMSE criterion (using the ratio of two successive elements of the spreading sequence modulated by the same symbol) obtains blind algorithms. This will impact design of future cellular and personal communication systems. The invention improves over the known state of the art in terms of convergence and steady state performance.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A differential mean minimum squared error (MMSE) data reception method comprising steps of:
   receiving data;
   sampling said data;
   applying MMSE criterion to said data, said MMSE criterion being applied to a ratio of said data appearing in successive observation intervals.

2. The method according to claim 1, wherein said data is received from a receive antenna array and further comprising steps of:
   beamforming after said sampling step by setting unknown symbols in said data of a predetermined user to be constant over chips excepting those at edges of symbol intervals in said data;

training, after said beamforming, using a known spreading sequence for said predetermined user as a differentially modulated training sequence at a chip rate of said chips;

conducting said applying step after said training.

3. The method according to claim 2, wherein said training step is conducted without known training sequences in said data.

4. The method according to claim 1, wherein said data is oversampled and further comprising steps of:

filtering after said sampling step by setting unknown symbols in said data of a predetermine user to be constant over chips excepting those at edges of symbol intervals in said data;

training, after said filtering, using a known spreading sequence for said predetermined user as a differentially modulated training sequence at a chip rate of said chips;

conducting said applying step after said training.

5. The method according to claim 2, further comprising a step of partially despreading said data over a predetermined number of chips prior to said applying step.

6. The method according to claim 5, further comprising a step of partially despreading said data over a predetermined number of chips prior to said applying step.

7. The method according to claim 1, wherein said applying step suppresses interference in said data.

8. A differential mean minimum squared error (MMSE) data reception method comprising steps of:

receiving data from a receiver output of linear receiver c that operates on a sequence of received vectors $\{r_n\}$, each received vector $r_n$ being an L-dimensional complex vector which is a sum of a number of signal vectors, plus noise, where each signal vector corresponds to intersymbol interference multiple access interference, where the output at time n of the linear receiver c to be designed is given by $$\langle c, r_n \rangle = \sum_{i=1}^{L} c^*[i] r_n[i],$$

where $$r_n = B_1[n] u_1 + \sum_{k=2}^{K} B_k[n] u_k + w_n,$$

where $u_1$ is the desired signal vector, and $u_2, \ldots, u_K$ are interference vectors varying slowly with n, where $\{B_k[n], k=1, \ldots, K\}$ vary arbitrarily with n and are application dependent, and $B_1[n]$ is a desired sequence and $\{B_k[n], k=2, \ldots, K\}$ are interference sequences, and where vector $w_n$ is discrete-time noise;

minimizing the mean squared error (MSE) between the receiver output and the desired sequence $B_1[n]$, given by $E[(<c,r_n>-B_1[n])^2]$ where the desired sequence $\{B_1[n]\}$ includes an unknown gain $g[n]$, and said minimizing assumes that $g[n]$ is approximately constant over two observation intervals that $$A_1[n] = \frac{B_1[n]}{B_1[n-1]}$$

is determinable, and further applying said minimizing by choosing the correlator c to satisfy the following MMSE criterion: minimize $$E[(<c, r_n>-A_1[n]<c, r_{n-1}>)^2]$$

subject to $$E[|<c, r_n>|^2] = c^H R c = 1$$

where $R = E[r_n r_n^H]$, and where $X^H$ denotes the conjugate transposed of x.

* * * * *

UNITED STATES PATENT AND TRADEMARK OFFICE
CERTIFICATE OF CORRECTION

PATENT NO. : 6,426,973 B1
DATED : July 30, 2002
INVENTOR(S) : Madhow et al.

It is certified that error appears in the above-identified patent and that said Letters Patent is hereby corrected as shown below:

Column 1,
Line 4, immediately after the title, please insert the following paragraph:

-- STATEMENT OF GOVERNMENT INTEREST
This invention was made with Government assistance under NSF Grant No. NCR96-24008, Office of Naval Research Grant No. N00014-95-1-0647 and Army Research Laboratory Grant No. DAAH04-95-1-0246. The Government has certain rights in the invention. --

Column 5,
Line 39, delete "$\hat{B}_n = \lambda \hat{B}_{n-1} + (1\lambda)[A_1 *[n]r_n r_{n-1}^H + A_1[n]r_{n-1}r_n^H$" and insert -- $\hat{B}_n = \lambda \hat{B}_{n-1} + (1-\lambda)[A_1 *[n]r_n r_{n-1}^H + A_1[n]r_{n-1}r_n^H$ -- therefor.

Column 6,
Line 5, insert -- where -- after $\sum_n b_{k,n} S_k(t - nT)$.
Line 59, delete "informaiton" and insert -- information -- therefor.

Column 7,
Line 19, insert -- . -- after "MAI".
Line 52, delete "nmodulated" and insert -- modulated -- therefor.

Column 10,
Line 3, delete "axe" and insert -- are -- therefor.
Line 7, delete "$C_{N1}$" and insert -- $c_{N1}$ -- therefor.
Line 26, delete "$P_i = |<c_i, r_n>|^2$" and insert
-- $P_i = |<c_i, r_n>|^2$ --therefor.

UNITED STATES PATENT AND TRADEMARK OFFICE
CERTIFICATE OF CORRECTION

PATENT NO. : 6,426,973 B1
DATED : July 30, 2002
INVENTOR(S) : Madhow et al.

It is certified that error appears in the above-identified patent and that said Letters Patent is hereby corrected as shown below:

Column 13,
Line 13, "predetermine" and insert -- predetermined -- therefor.

Signed and Sealed this

Twenty-eighth Day of January, 2003

JAMES E. ROGAN
*Director of the United States Patent and Trademark Office*